(12) United States Patent
Mather et al.

(10) Patent No.: US 8,794,688 B2
(45) Date of Patent: Aug. 5, 2014

(54) DOOR ASSEMBLY FOR A VEHICLE

(75) Inventors: Carl Mather, Lake Orion, MI (US); Todd Teasdale, Canton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 37 days.

(21) Appl. No.: 13/356,682

(22) Filed: Jan. 24, 2012

(65) Prior Publication Data
US 2013/0186002 A1  Jul. 25, 2013

(51) Int. Cl.
*B60J 5/06* (2006.01)

(52) U.S. Cl.
USPC .......................................................... 296/78.1

(58) Field of Classification Search
USPC ............... 296/155, 190.11; 49/360, 139, 197, 49/120, 409, 411, 404, 410; 160/201, 206; 16/322, 330, 334
See application file for complete search history.

(56) References Cited

U.S. PATENT DOCUMENTS

| | | | |
|---|---|---|---|
| 4,152,872 A * | 5/1979 | Tanizaki et al. | 49/214 |
| 5,316,365 A * | 5/1994 | Kuhlman et al. | 296/155 |
| 5,361,540 A * | 11/1994 | Rogers et al. | 49/449 |
| 5,454,618 A * | 10/1995 | Sullivan | 296/97.22 |
| 5,481,830 A * | 1/1996 | Gooding et al. | 49/449 |
| 5,536,061 A * | 7/1996 | Moore et al. | 296/155 |
| 5,618,080 A * | 4/1997 | Sullivan et al. | 296/155 |
| 5,896,704 A | 4/1999 | Neag et al. | |
| 5,927,789 A * | 7/1999 | Mezzadri et al. | 296/64 |
| 6,007,141 A * | 12/1999 | Thomas et al. | 296/155 |
| 6,087,794 A * | 7/2000 | Kawanobe | 318/446 |
| 6,134,837 A * | 10/2000 | Kawanobe et al. | 49/360 |
| 6,164,015 A * | 12/2000 | Kawanobe et al. | 49/360 |
| 6,279,267 B1 * | 8/2001 | Barrett et al. | 49/224 |
| 6,328,374 B1 * | 12/2001 | Patel | 296/155 |
| 6,386,621 B1 * | 5/2002 | Kozak et al. | 296/155 |
| 6,515,229 B2 * | 2/2003 | Aoki et al. | 174/72 A |
| 6,553,719 B1 * | 4/2003 | Stone et al. | 49/358 |
| 6,588,829 B2 * | 7/2003 | Long et al. | 296/155 |
| 6,637,803 B2 * | 10/2003 | Moreau | 296/155 |
| 6,669,266 B1 * | 12/2003 | Pugh et al. | 296/146.11 |
| 6,781,058 B1 * | 8/2004 | DeCicco et al. | 174/72 A |
| 6,840,567 B2 * | 1/2005 | Fushimi et al. | 296/155 |
| 6,851,743 B2 * | 2/2005 | George et al. | 296/202 |
| 6,860,543 B2 * | 3/2005 | George et al. | 296/146.12 |
| 6,932,417 B2 * | 8/2005 | Barczynski et al. | 296/155 |
| 6,962,383 B2 * | 11/2005 | Takenoshita et al. | 296/65.03 |
| 6,971,706 B2 * | 12/2005 | Yoshida et al. | 296/155 |
| 7,073,291 B2 * | 7/2006 | Kawanobe et al. | 49/26 |
| 7,104,588 B2 * | 9/2006 | George et al. | 296/146.12 |
| 7,144,068 B2 * | 12/2006 | Oxley et al. | 296/155 |
| 7,243,461 B2 * | 7/2007 | Rogers et al. | 49/360 |
| 7,243,978 B2 * | 7/2007 | Mather et al. | 296/155 |
| 7,322,636 B1 * | 1/2008 | Woodhouse et al. | 296/147 |
| 7,325,361 B2 * | 2/2008 | Rogers et al. | 49/360 |

(Continued)

*Primary Examiner* — Kiran B Patel
(74) *Attorney, Agent, or Firm* — Ralph E Smith (57) ABSTRACT

A door assembly for a vehicle is provided and may include a door selectively movable relative to the vehicle between an open state and a closed state. A first track may slidably support the door relative to the vehicle between the open state and the closed state and a second track may be spaced apart from the first track, may slidably support the door relative to the vehicle between the open state and the closed state, and may include a first track portion and a second track portion. The first track portion may be operable to slide relative to the second track portion when the door is moved a predetermined distance relative to the vehicle.

20 Claims, 10 Drawing Sheets

(56) References Cited

U.S. PATENT DOCUMENTS

| | | | |
|---|---|---|---|
| 7,390,054 B2* | 6/2008 | Suzuki | 296/187.12 |
| 7,422,268 B2* | 9/2008 | Kothe et al. | 296/155 |
| 7,520,557 B2* | 4/2009 | Yoshida et al. | 296/155 |
| 7,549,251 B2* | 6/2009 | Jarolim | 49/223 |
| 7,621,586 B2* | 11/2009 | Fischer et al. | 296/155 |
| 7,647,728 B2* | 1/2010 | Bortoluzzi | 49/209 |
| 7,703,242 B2* | 4/2010 | Goebel et al. | 49/425 |
| 7,717,493 B2* | 5/2010 | Plavetich | 296/155 |
| 7,950,109 B2* | 5/2011 | Elliott et al. | 16/366 |
| 7,950,719 B2* | 5/2011 | Elliott et al. | 296/155 |
| 7,977,903 B2* | 7/2011 | Kamiya | 318/469 |
| 8,007,028 B2* | 8/2011 | Pencak et al. | 296/155 |
| 8,020,923 B2* | 9/2011 | Gaudig | 296/153 |
| 8,070,102 B2* | 12/2011 | Kobayashi et al. | 244/129.5 |
| 8,234,816 B2* | 8/2012 | Heuel et al. | 49/216 |
| 8,303,028 B2* | 11/2012 | Domlovil et al. | 296/193.05 |
| 8,353,555 B2* | 1/2013 | Boettcher | 296/155 |
| 8,413,379 B2* | 4/2013 | Ishida et al. | 49/216 |
| 8,464,469 B2* | 6/2013 | Oberheide | 49/360 |
| 8,469,437 B2* | 6/2013 | Zanetti et al. | 296/146.16 |
| 8,596,710 B2* | 12/2013 | Naeg et al. | 296/155 |
| 2006/0151231 A1* | 7/2006 | Bucksch et al. | 180/337 |
| 2006/0225358 A1* | 10/2006 | Haag et al. | 49/360 |
| 2008/0072497 A1* | 3/2008 | Oxley | 49/360 |
| 2009/0189412 A1* | 7/2009 | Plavetich | 296/155 |
| 2009/0199480 A1* | 8/2009 | Ehrhard | 49/212 |
| 2009/0230722 A1* | 9/2009 | Krajenke et al. | 296/146.5 |
| 2009/0230724 A1* | 9/2009 | Fischer et al. | 296/155 |
| 2010/0154313 A1* | 6/2010 | Elliott et al. | 49/360 |
| 2010/0295337 A1* | 11/2010 | Elliott et al. | 296/202 |

\* cited by examiner

DOOR ASSEMBLY FOR A VEHICLE

FIELD

The present disclosure relates to door assemblies and more particularly to sliding-door assemblies for vehicles.

BACKGROUND

Vehicle manufacturers strive to provide quick and easy access to passenger and storage compartments of a vehicle to facilitate entry and use of the vehicle. For example, minivans and sport-utility vehicles typically include a powered, rear-closure panel that may be moved between a closed state and an open state by depressing a button located either within the vehicle or on a key fob. Similarly, vans and minivans often incorporate one or more sliding doors that likewise may be operated between an open state and a closed state by depressing a button located within a passenger compartment of the vehicle or on a key fob.

Opening a rear-closure panel or a side door simply by depressing a button located within the passenger compartment allows for easy and quick access to the passenger compartment and/or storage compartment of the vehicle. Allowing such operation of a rear-closure panel and/or sliding-side door remotely via a key fob further increases the utility of such powered, rear-closure panels and sliding-side doors, as vehicle occupants can remotely control access to a passenger compartment and/or storage compartment of the vehicle.

Conventional sliding-side door assemblies typically include a side door slidably supported relative to a vehicle by three discrete tracks. For example, a minivan may incorporate a first track located proximate to a floor pan of the vehicle, a second track located proximate to a roof panel of the vehicle, and a third track located between the first track and the second track and proximate to and behind a C-pillar of the vehicle. The first track, second track, and third track cooperate to control movement of the sliding-side door between a closed state and an open state and likewise cooperate to support the door relative to the vehicle. Specifically, each of the first track, the second track, and the third track receives a series of rollers associated with the sliding door that permit the door to translate relative to the vehicle. Further, the first track, the second track, and the third track each cooperate to support the overall weight of the sliding door and maintain the stability of the door throughout the range-of-motion of the door when moving between the closed state and the open state.

While conventional sliding-side door assemblies adequately guide and support sliding doors relative to a vehicle, conventional sliding-side door assemblies require three tracks to properly support, position, and maintain the stability of the sliding-side door relative to the vehicle when moving between an open state and a closed state. Further, sliding-side doors may typically only be used in a vehicle having a substantially flat or uniform side panel that can efficiently accommodate the length of each track and can permit clearance of the sliding-side door when moving from a closed state to an open state. As such, sliding-side doors are typically reserved for vans and minivans that have a substantially flat, elongated side panel and cannot be used with vehicles having a somewhat short and uneven side panel such as a sedan, sport-utility vehicle, or truck, as such vehicles cannot properly accommodate the requisite length of a track associated with a conventional sliding-side door assembly.

SUMMARY

A door assembly for a vehicle is provided and may include a door selectively movable relative to the vehicle between an open state and a closed state. A first track may slidably support the door relative to the vehicle between the open state and the closed state and a second track may be spaced apart from the first track, may slidably support the door relative to the vehicle between the open state and the closed state, and may include a first track portion and a second track portion. The first track portion may be operable to slide relative to the second track portion when the door is moved a predetermined distance relative to the vehicle.

In another configuration, a door assembly for a vehicle is provided and may include a door selectively movable relative to the vehicle between an open state and a closed state. A first track may slidably support the door relative to the vehicle between the open state and the closed state and a second track may be spaced apart from the first track, may slidably support the door relative to the vehicle between the open state and the closed state, and may include a first track portion and a second track portion. The first track portion may telescope from the second track portion when the door is moved a predetermined distance relative to the vehicle.

Further areas of applicability of the present invention will become apparent from the detailed description and claims provided hereinafter. It should be understood that the detailed description and specific examples, while indicating the preferred embodiment of the invention, are intended for purposes of illustration only and are not intended to limit the scope of the invention.

DETAILED DESCRIPTION

Figure 1:
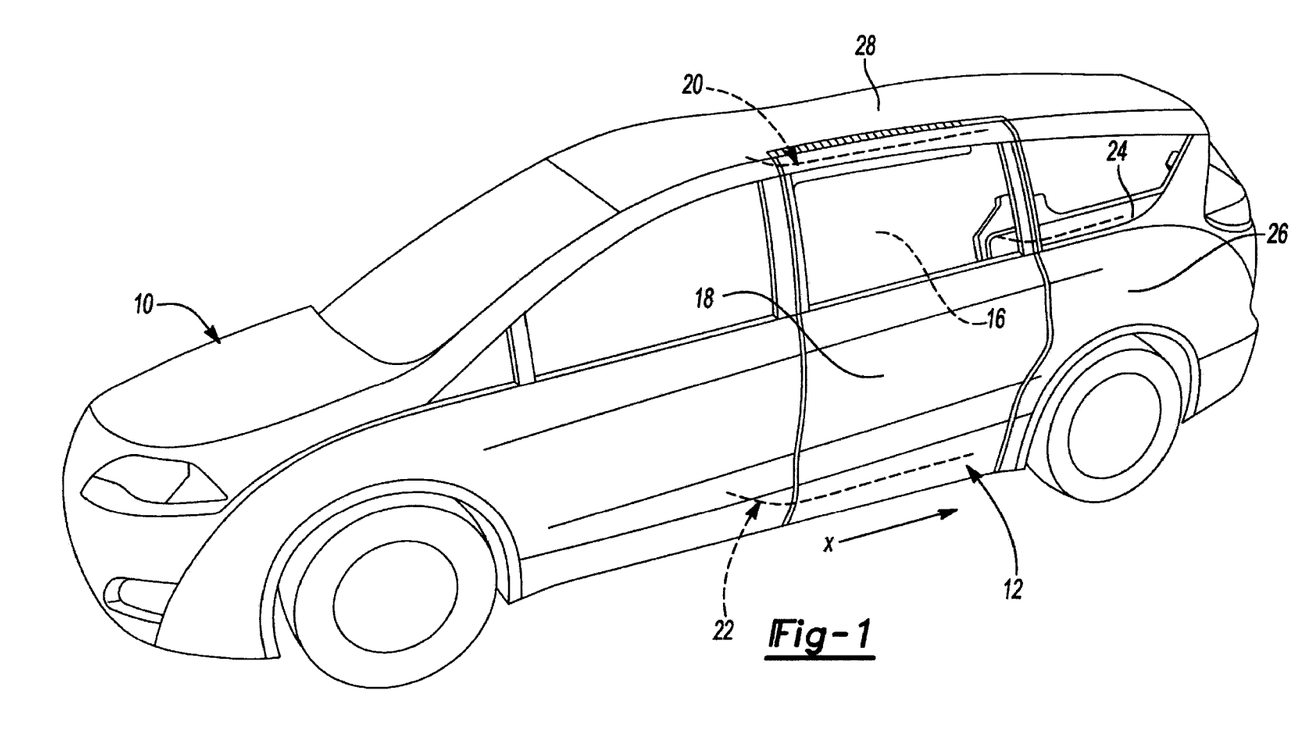
FIG. 1 is a perspective view of a vehicle incorporating a sliding-side door assembly in accordance with the principles of the present disclosure.
Figure 2:
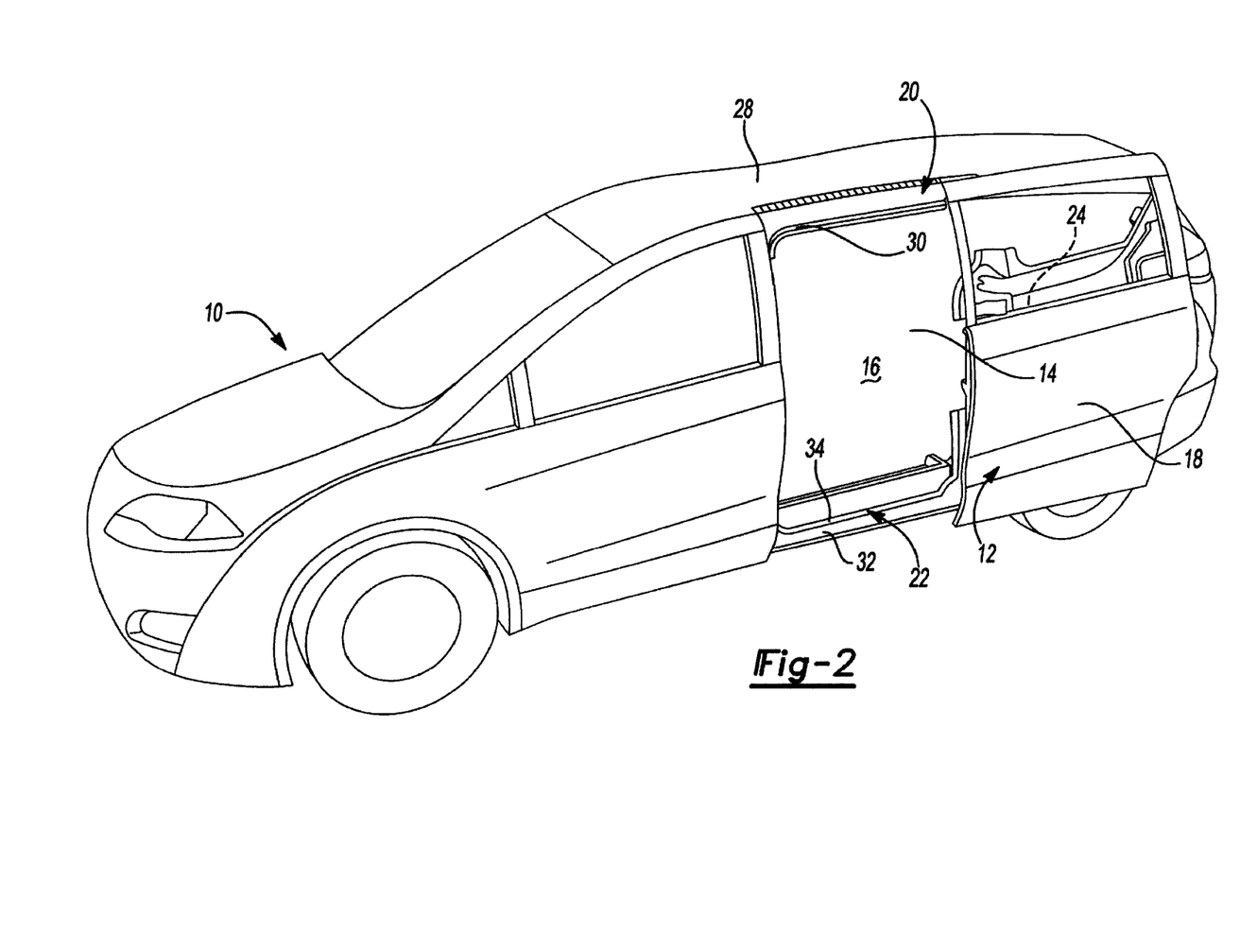
FIG. 2 is a perspective view of the vehicle of FIG. 1 showing the sliding-side door assembly in an open state.

With particular reference to FIGS. 1-7, a vehicle 10 is provided. The vehicle 10 includes a side-door assembly 12 that may be selectively moved relative to an opening 14 of the vehicle 10 between a closed state (FIG. 1) and an open state (FIG. 2). When the side-door assembly 12 is in the open state, access to a passenger compartment 16 of the vehicle 10 is permitted generally via the opening 14.

With continued reference to FIGS. 1-7, the side-door assembly 12 is shown to include a closure panel or side door 18, an upper track assembly 20, a lower track assembly 22, and a mid-track assembly 24. The side door 18 may be moved relative to a rear-quarter panel 26 of the vehicle 10 between a closed state (FIG. 1), preventing access to the passenger compartment 16 via the opening 14, and an open state (FIG. 2), permitting access to the passenger compartment 16 via the opening 14. The side door 18 may include a series of rollers that are respectively received within the upper track assembly 20, lower track assembly 22, and mid-track assembly 24 to permit slideable movement of the side door 18 relative to the rear-quarter panel 26 when the side door 18 is moved between the open state and the closed state.

The upper track assembly 20 may be located proximate to a roof panel 28 and may include a channel 30 that receives a roller (not shown) associated with the side door 18. The rollers of the side door 18 may be received within the channel 30 and may concurrently serve to position and support the side door 18 throughout a range-of-motion of the side door 18 relative to the rear-quarter panel 26. Specifically, the rollers may follow the general shape of the channel 30 and, thus, not only aid in supporting the side door 18 relative to the rear-quarter panel 26 but, also, position the side door 18 in a desired location relative to the rear-quarter panel 26 throughout a range-of-motion of the side door 18 relative to the rear-quarter panel 26 as the side door 18 is moved between the closed state and the open state.

The lower track assembly 22 is disposed proximate to a sill 32 of the vehicle 10 and may include a channel 34. As with the upper track assembly 20, the lower track assembly 22 may also receive rollers (not shown) associated with the side door 18 that are disposed generally within the channel 34. The channel 34 cooperates with the rollers to position and support the side door 18 throughout a range-of-motion of the side door 18 relative to the rear-quarter panel 26. Specifically, the rollers move within the channel 34 and generally move along a direction defined by the overall shape and configuration of the channel 34.

As described, movement of the side door 18 relative to the rear-quarter panel 26 and the positioning of the side door 18 throughout the range-of-motion of the side door 18 relative to the rear-quarter panel 26 is accomplished due to the overall shape of the channels 30, 34 of the upper track assembly 20 and lower track assembly 22, respectively. In other words, the channels 30, 34 of the upper track assembly 20 and lower track assembly 22, respectively, cooperate to properly position the side door 18 relative to the rear-quarter panel 26 throughout a range-of-motion of the side door 18 when the side door 18 is moved between the closed state and the open state.

Figure 5:
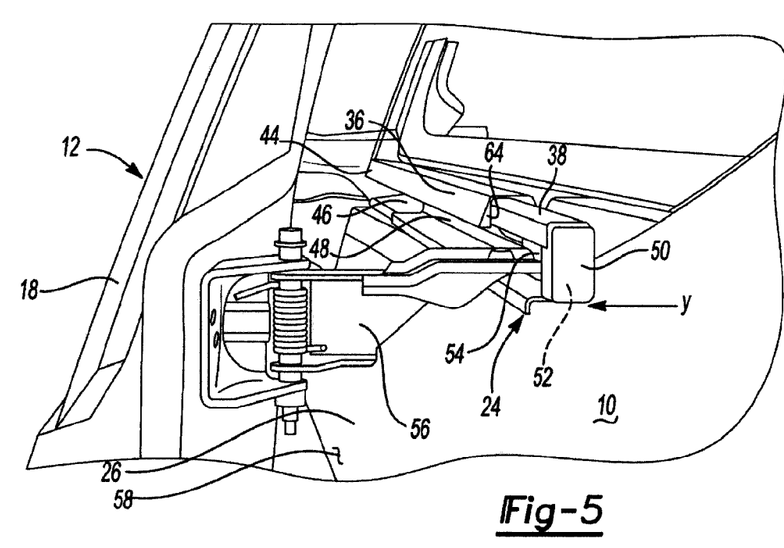
FIG. 5 is a partial perspective view of the vehicle of FIG. 1 showing the sliding-side door assembly moving from a closed state to an open state and a track assembly moving from a retracted state to an extended state.
Figure 6:
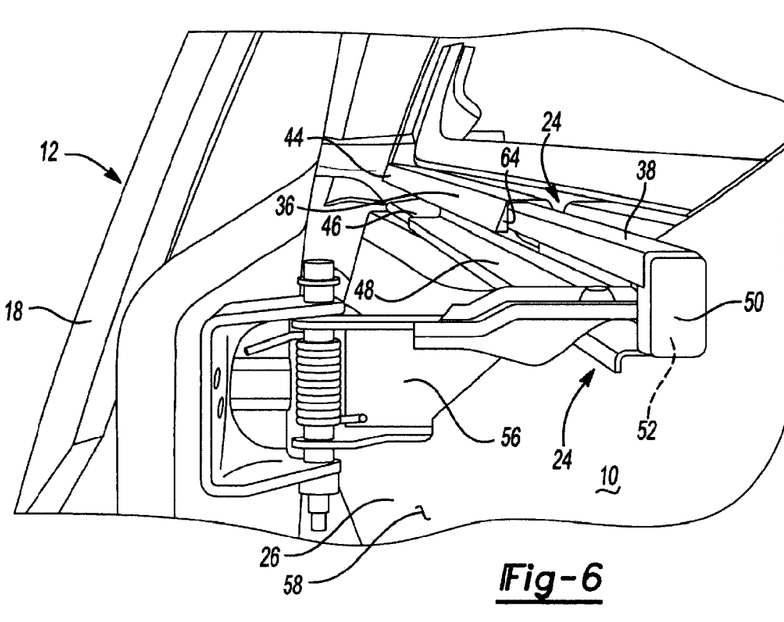
FIG. 6 is a partial perspective view of the vehicle of FIG. 1 showing the sliding-side door assembly in an open state and a track assembly in a fully extended and pivoted state.

The mid-track assembly 24 is disposed generally between the upper track assembly 20 and the lower track assembly 22 and may extend into the rear-quarter panel 26. The mid-track assembly 24 may include a first track portion 36, a second track portion 38, a ramp 40, and a biasing member 42. The first track portion 36 may be pivotably supported at a first end 44 relative to the rear-quarter panel 26 and may slidably receive the second track portion 38 within a channel 46 (FIG. 6). Specifically, the second track portion 38 may be slidably received within the channel 46 of the first track portion 36 such that the second track portion 38 is in a telescoping relationship with the first track portion 36 and may be moved between a retracted state (FIGS. 3 and 4) and an extended state (FIGS. 5 and 6).

The second track portion 38 may include a channel 48 as well as a distal end 50 defining a stop 52. The channel 48 may receive at least one roller 54 therein that is rotatably attached to the side door 18 via a bracket 56. The roller 54 is rotatable relative to the bracket 56 and therefore permits movement of the door 18 and bracket 56 relative to the channel 48 as the door 18 is moved between the open state and the closed state. The bracket 56 serves to support the door 18 relative to the second track portion 38 and also properly spaces the side door 18 a predetermined distance away from an outer surface 58 of the rear-quarter panel 26 when the side door 18 moves from the closed state to the open state.

Figure 3:
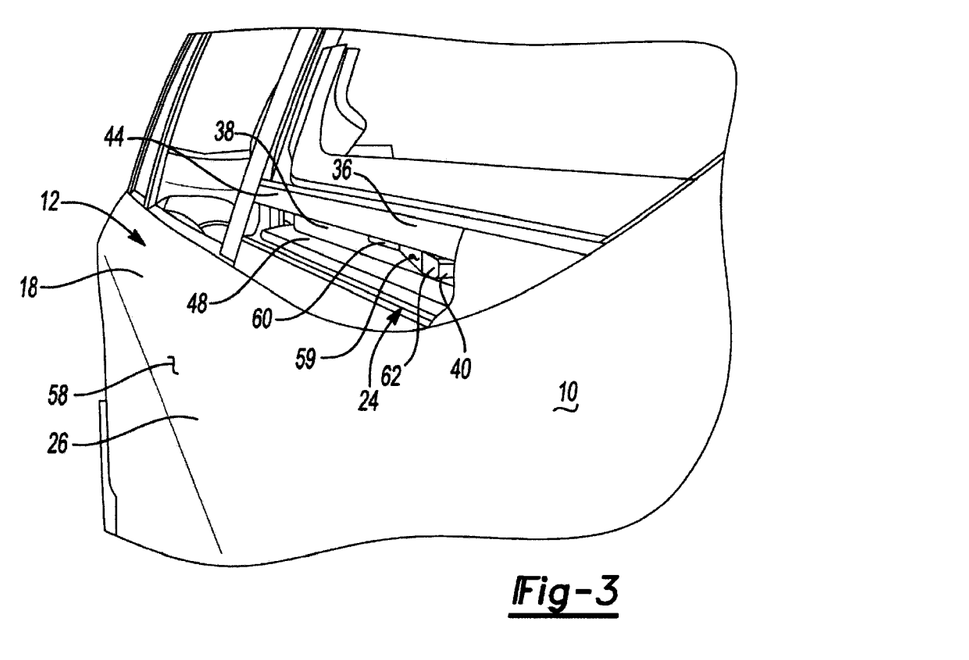
FIG. 3 is a partial perspective view of the vehicle of FIG. 1 showing the sliding-side door assembly in a closed state and a track assembly in a retracted state.
Figure 4:
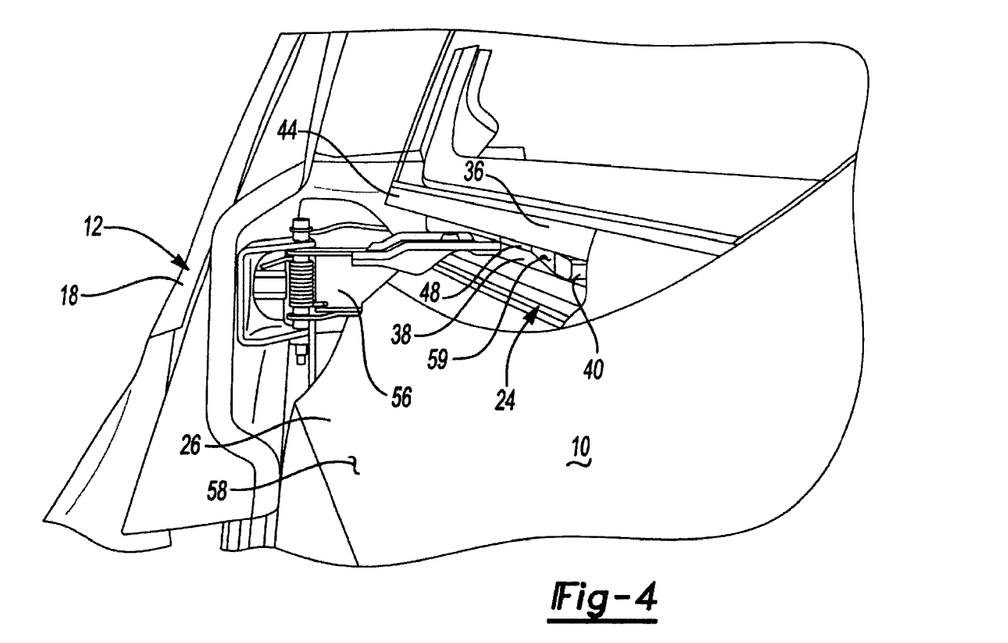
FIG. 4 is a partial perspective view of the vehicle of FIG. 1 showing the sliding-side door assembly initially moving from a closed state to an open state.

With particular reference to FIGS. 3 and 4, the ramp 40 is shown to include a cam surface 59 that cooperates with the roller 54 of the side door 18 to cause the first track portion 36 to pivot about the first end 44. Specifically, the ramp 40 may be fixed relative to the rear-quarter panel 26 and may protrude through an opening (not shown) formed through each of the channels 46, 48 of the first track portion 36 and second track portion 38, respectively, such that the ramp 40 extends into the channel 48 of the second track portion 38. Because the ramp 40 extends generally into the channel 48 of the second track portion 38 when the side door 18 is in the closed state, the roller 54 contacts the cam surface 59 as the door 18 is moved toward the open state, thereby causing a force to be applied to the second track portion 38. The applied force causes the first track portion 36 and the second track portion 38 to pivot about the first end 44 and move away from the rear quarter panel 26, as will be described in detail below.

The biasing member 42 may be a coil spring (FIG. 7) and may be disposed between the first track portion 36 and the rear-quarter panel 26. The biasing member 42 may apply a force on the first track portion 36 to bias the first track portion 36 in a direction generally toward the rear-quarter panel 26.

With particular reference to FIGS. 3-6, operation of the side-door assembly 12 will be described in detail. When a force is applied to the side door 18 to move the side door 18 relative to the rear-quarter panel 26 from the closed state (FIG. 1) to the open state (FIG. 2), the side door 18 follows the path defined by the upper track assembly 20, lower track assembly 22, and mid-track assembly 24. Upon sufficient movement of the side door 18 in the direction (X) shown in FIG. 1, the roller 54 traverses the second track portion 38 until the roller 54 encounters the cam surface 59 of the ramp 40. The roller 54 contacts the cam surface 59 and rides along the cam surface 59 generally from a lower portion 60 to an upper portion 62 (FIG. 3).

As the roller 54 moves from the lower portion 60 of the cam surface 59 to the upper portion 62 of the cam surface 59, a force is applied to the first track portion 36 via the second track portion 38, thereby causing the first track portion 36 to move against the force exerted thereon by the biasing member 42. Such movement of the first track portion 36 causes the first track portion 36 and, thus, the second track portion 38, to pivot about the first end 44 of the first track portion 36 and move generally away from the rear-quarter panel 26 in a direction (Y), as shown in FIG. 5.

Movement of the first track portion 36 and second track portion 38 in the direction (Y) against the force exerted on the first track portion 36 by the biasing member 42 causes the first track portion 36 and second track portion 38 to move sufficiently away from the rear-quarter panel 26 such that the second track portion 38 is permitted to slide relative to the first track portion 36. Movement of the second track portion 38 relative to the first track portion 36 is accomplished by the roller 54 contacting the stop 52 of the distal end 50 of the second track portion 38, thereby applying a force on the second track portion 38 and causing the second track portion 38 to telescope from the first track portion 36.

The second track portion 38 continues to move relative to the first track portion 36 until the second track portion 38 contacts a stop 64 (FIG. 5) of the first track portion 36. Contact between the second track portion 38 and the stop 64 of the first track portion 36 prevents further movement of the second track portion 38 relative to the first track portion 36. Once the second track portion 38 contacts the stop 64 of the first track portion 36, the side door 18 is in the fully open position, as shown in FIG. 2.

A force may be applied to the side door 18 to move the side door from the open state to the closed state by applying a force in a direction opposite to direction (X). Movement of the side door 18 causes the roller 54 to move within the second track portion 38 and causes the second track portion 38 to move relative to the first track portion 36 and telescope into the channel 46 of the first track portion 36. Once the second track portion 38 is received within the first track portion 36 such that the distal end 50 of the second track portion 38 is substantially planar with a distal end of the first track portion 36, the biasing member 42 is permitted to move the first track portion 36 and second track portion 38 relative to the rear-quarter panel 26 in a direction substantially opposite to direction (Y). Sufficient movement of the first track portion 36 relative to the rear-quarter panel 26 in a direction substantially opposite to direction (Y) continues until the first track portion 36 contacts the rear-quarter panel 26 and is returned to the position shown in FIG. 3. In this position, the roller 54 continues to traverse the channel 46 of the first track portion 36 until the roller 54 is disposed proximate to the first end 44 and the side door 18 is returned to the closed state.

The foregoing operation of the side-door assembly 12 is described as requiring a force to be applied to the side door 18 to move the side door 18 between the closed state and the open state. The force may be manually applied to the side door 18 or may be applied to the side door 18 via a powered system (not shown).

With particular reference to FIGS. 7-18, a vehicle 100 incorporating a side-door assembly 102 is provided. As with the vehicle 10 and side-door assembly 12, the side-door assembly 102 is movable between a closed state (solid lines in FIG. 8) and an open state (dashed lines in FIG. 8), whereby the side-door assembly 102 closes an opening 104 of the vehicle 100 in the closed state and permits access to a passenger compartment 106 via the opening 104 in the open state.

Figures 7, 8:
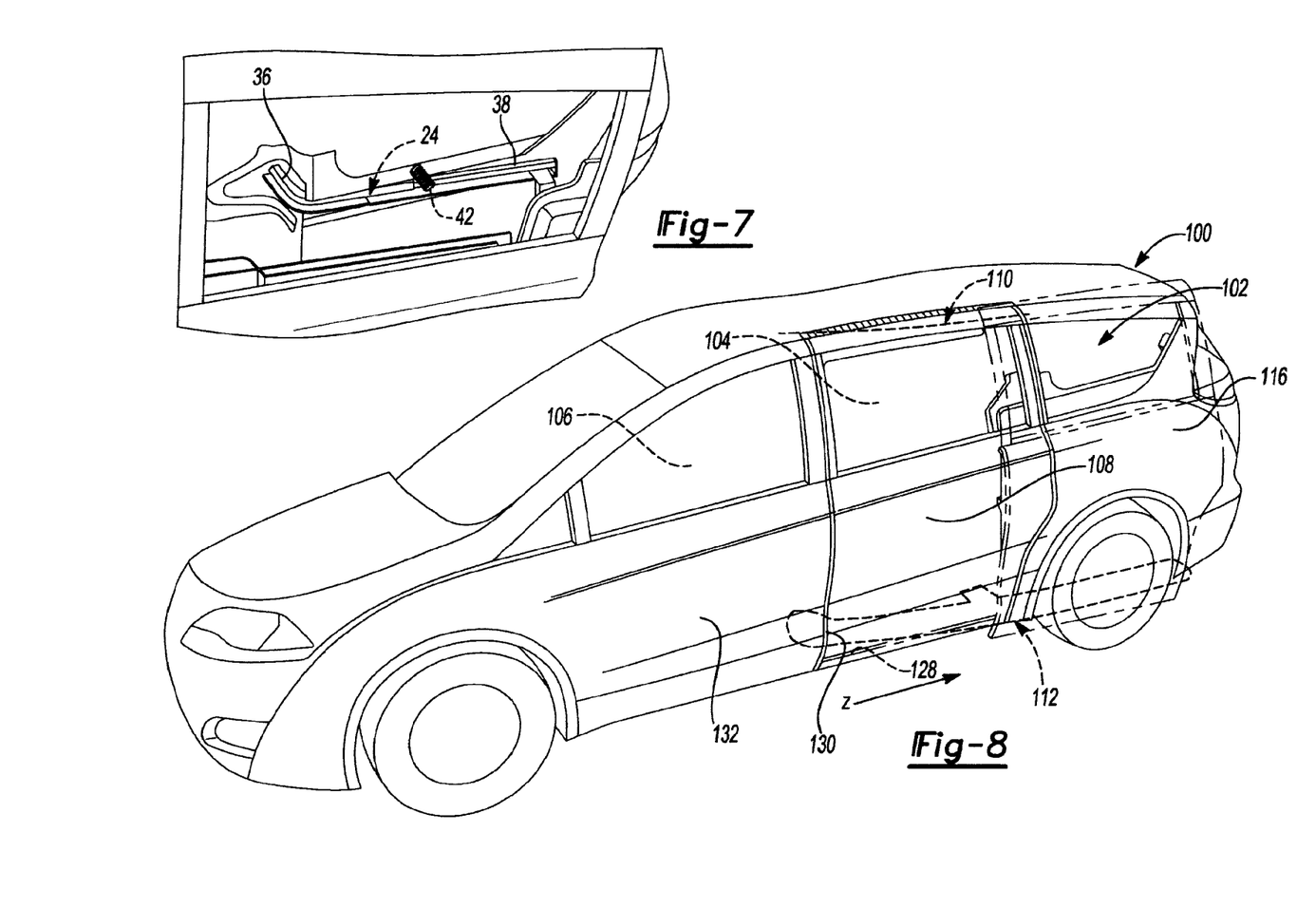
FIG. 7 is a partial perspective view of the vehicle of FIG. 1 showing the sliding-side door assembly in an open state and a track assembly in a pivoted and extended state.
FIG. 8 is a perspective view of a vehicle incorporating a sliding-side door assembly in accordance with the principles of the present disclosure.
Figure 9:
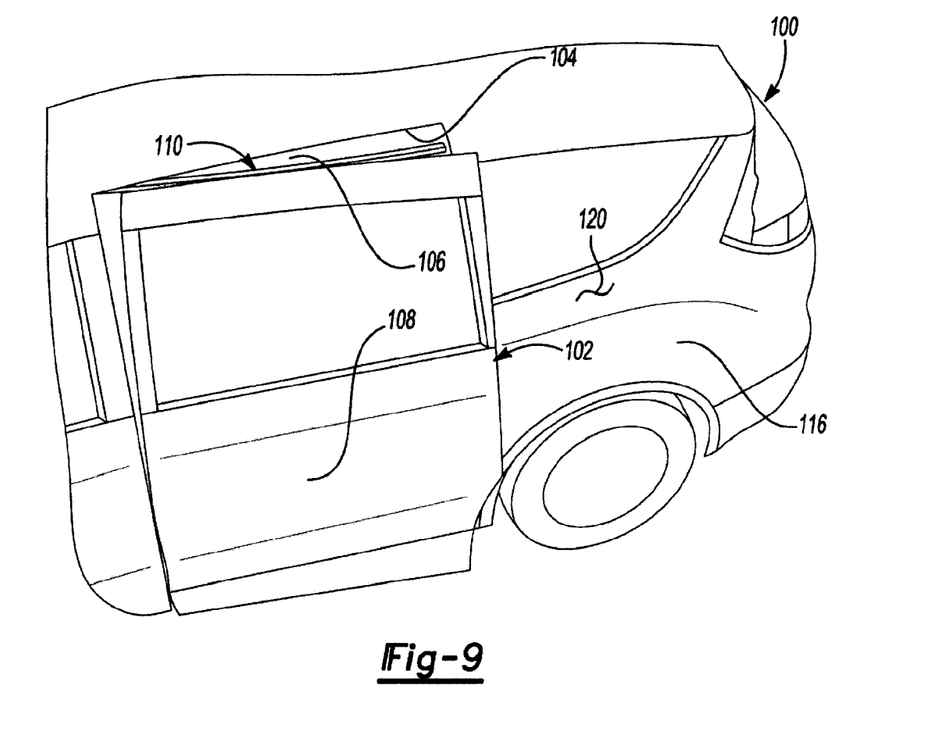
FIG. 9 is a partial perspective view of the vehicle of FIG. 8 showing the sliding-side door assembly initially moving from a closed state to an open state.
Figure 10:
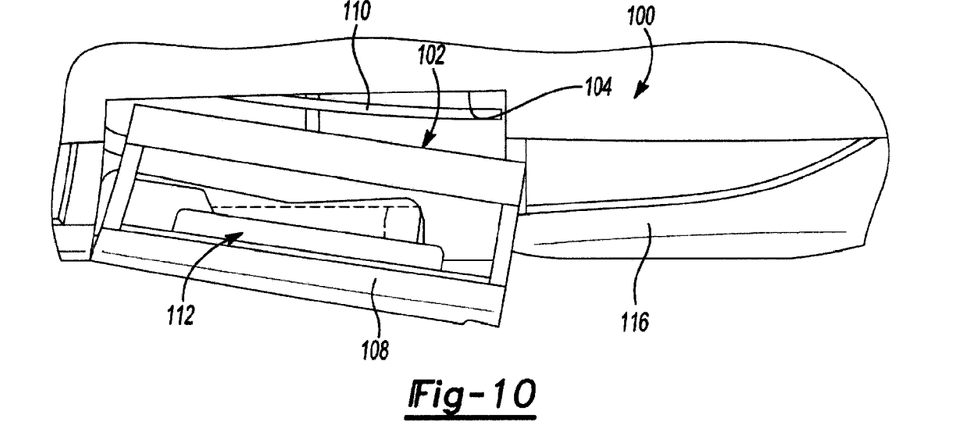
FIG. 10 is a partial, top perspective view of the vehicle of FIG. 8 showing the sliding-side door assembly initially moving from a closed state to an open state.
Figure 11:
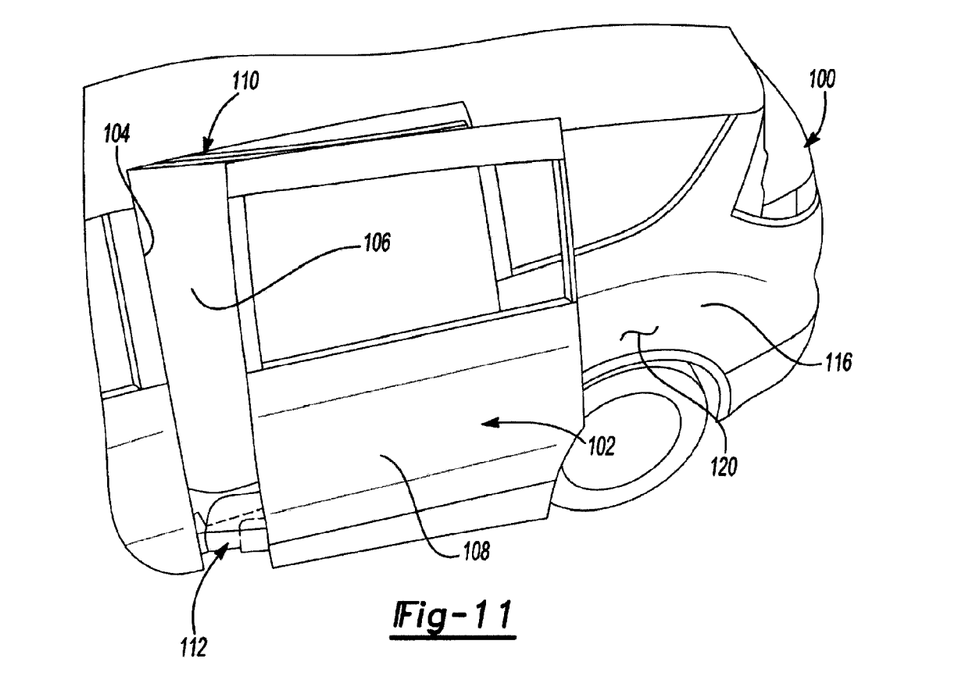
FIG. 11 is a partial perspective view of the vehicle of FIG. 8 showing the sliding-side door assembly moving from a closed state to an open state.
Figure 12:
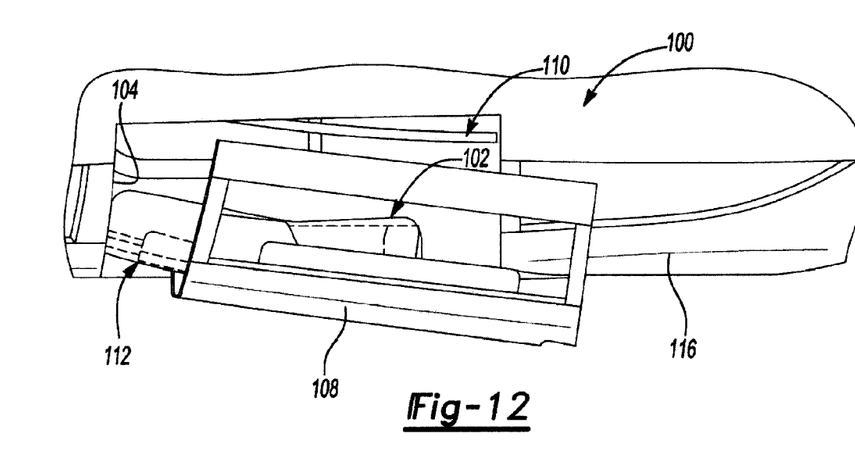
FIG. 12 is a partial, top perspective view of the vehicle of FIG. 8 showing the sliding-side door assembly moving from a closed state to an open state.

The side-door assembly 102 may include a closure panel or side door 108, an upper track assembly 110, a lower track assembly 112, and an actuation mechanism 114. The side door 108 is translatable relative to the vehicle 100 in a direction (Z), as shown in FIG. 8, to allow the side door 108 to move between the closed state and the open state. Movement of the side door 108 relative to a rear-quarter panel 116 of the vehicle 100 is dictated and controlled by the upper track assembly 110 and the lower track assembly 112.

The upper track assembly 110 may include a channel 118 (FIG. 13) that receives a series of rollers (none shown) associated with the side door 108. Engagement between the rollers of the side door 108 and the channel 118 of the upper track assembly 110 allows the side door 108 to move relative to and within the channel 118 of the upper track assembly 110 and, thus, allows the side door 108 to translate substantially in the direction (Z) relative to the rear-quarter panel 116. The upper track assembly 110 and, thus, the channel 118 may include a substantially arcuate shape to allow the side door 108 to concurrently slide relative to and move away from an outer surface 120 of the rear-quarter panel 116 when the side door 108 is initially moved from the closed state to the open state to allow the side door 108 to be spaced apart from the rear-quarter panel 116 when the side door 108 moves into the open state.

In addition to providing for translational movement of the side door 108 in the direction (Z), engagement between the rollers of the side door 108 and the channel 118 also permits the side door 108 to pivot about the rollers to allow the side door 108 to tilt during movement of the side door 108 between the open state and the closed state. Permitting the side door 108 to tilt during movement of the side door 108 between the open state and the closed state allows a bottom portion of the side door 108 proximate to the lower track assembly 112 to move further away from the rear-quarter panel 116 while concurrently retaining the rollers within the channel 118 of the upper track assembly 110.

The lower track assembly 112 may include a first track portion 122, a second track portion 124, and a third track portion 126. The first track portion 122, second track portion 124, and third track portion 126 may be in a telescoping relationship to one another such that the first track portion 122 is received within the second track portion 124 and the second track portion 124 is received within the third track portion 126 when the side door 108 is in the closed state. The first track portion 122 may be pivotably mounted to the vehicle 100 proximate to a sill 128 of the vehicle 100 at a first end 130 of the first track portion 122. The first end 130 may be directly and pivotably attached to the sill 128 or, alternatively, may include a link (not shown) that concurrently permits the first end 130 of the first track portion 122 to both pivot relative to the sill 128 and move generally away from the sill in a direction (Q) shown in FIG. 15. Allowing the first track portion 122 to move in the direction (Q) and concurrently pivot about the first end 130 relative to the sill 128 allows the side door 108 to sufficiently move away from a front door 132 of the vehicle 100 such that sufficient clearance is provided between the side door 108 and the front door 132 to permit independent operation of the side door 108 and front door 132.

The second track portion 124 may include a channel 134 (FIG. 16) that slidably receives the first track portion 122 therein when the side door 108 is in the closed state. Likewise, the third track portion 126 may include a channel 136 that slidably receives the second track portion 124 therein when the side door 108 is in the closed state. Allowing the first track portion 122 to be slidably received within the channel 134 of the second track portion 124 and allowing the second track portion 124 to be slidably received within the channel 136 of the third track portion 126 allows the first track portion 122, second track portion 124, and third track portion 126 to move from a retracted state (FIG. 16) to an extended state (FIG. 18) when the side door 108 is moved from the closed state to the open state (FIG. 8) relative to the rear-quarter panel 116 of the vehicle 100.

The third track portion 126 may be pivotably attached to a bottom portion of the side door 108 such that the side door 108 is fixed for movement with the third track portion 126 in the direction (Z) shown in FIG. 1 when the side door 108 is moved between the closed state and the open state. While the side door 108 is described as being fixed for movement with the third track portion 126 in the direction (Z), the side door 108 may also be pivotably attached to the third track portion 126 to allow the side door 108 to pivot relative to the third track portion 126 when the third track portion 126 telescopes away from the first track portion 122 and second track portion 124 and generally away from the outer surface 120 of the rear-quarter panel 116. Specifically, because the rear-quarter panel 116 includes a substantially curved outer surface 120, the first track portion 122, second track portion 124, and third track portion 126 must pivot about the first end 130 of the first track portion 122 when the side door 108 is initially moved from the closed state to the open state to provide sufficient clearance between the second track portion 124 and third track portion 126 when the side door 108 is moved in the direction (Z) relative to the rear-quarter panel 116 to prevent contact between the side door 108 and either track portion 124, 126 and the outer surface 120 of the rear-quarter panel 116. Because the first track portion 122 and, thus, the second track portion 124 and third track portion 126 pivot about the first end 130 and, therefore, cause the track portions 122, 124, 126 to move in a direction substantially away from the outer surface 120 of the rear-quarter panel 116, the side door 108 may be required to pivot relative to the third track portion 126 to allow a top portion of the side door 108 proximate to the upper track assembly 110 to remain in close proximity to and within the channel 118 of the upper track assembly 110 while concurrently allowing the bottom portion of the side door 108 disposed proximate and attached to the third track portion 126 to concurrently move away from the outer surface 120 of the rear-quarter panel 116.

Figure 16:
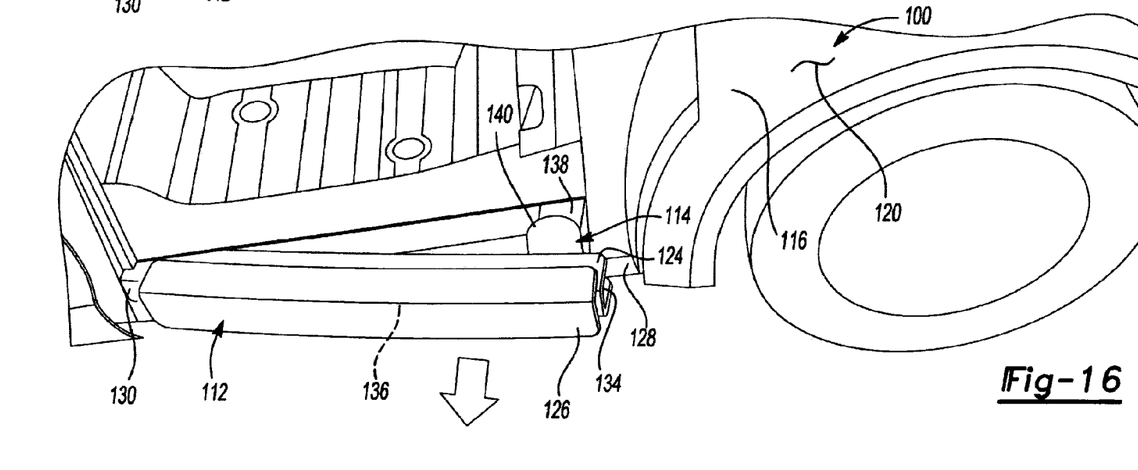
FIG. 16 is a partial perspective view of the vehicle of FIG. 8 showing the track assembly of FIG. 15 in a pivoted state.
Figure 17:
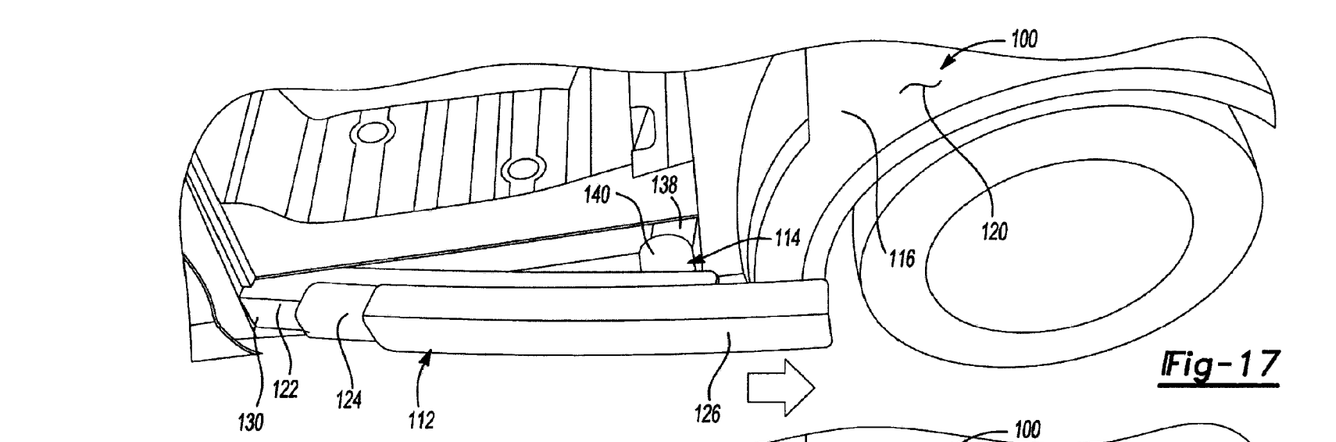
FIG. 17 is a partial perspective view of the vehicle of FIG. 8 showing the track assembly of FIG. 15 in a pivoted and partially extended state.
Figure 18:
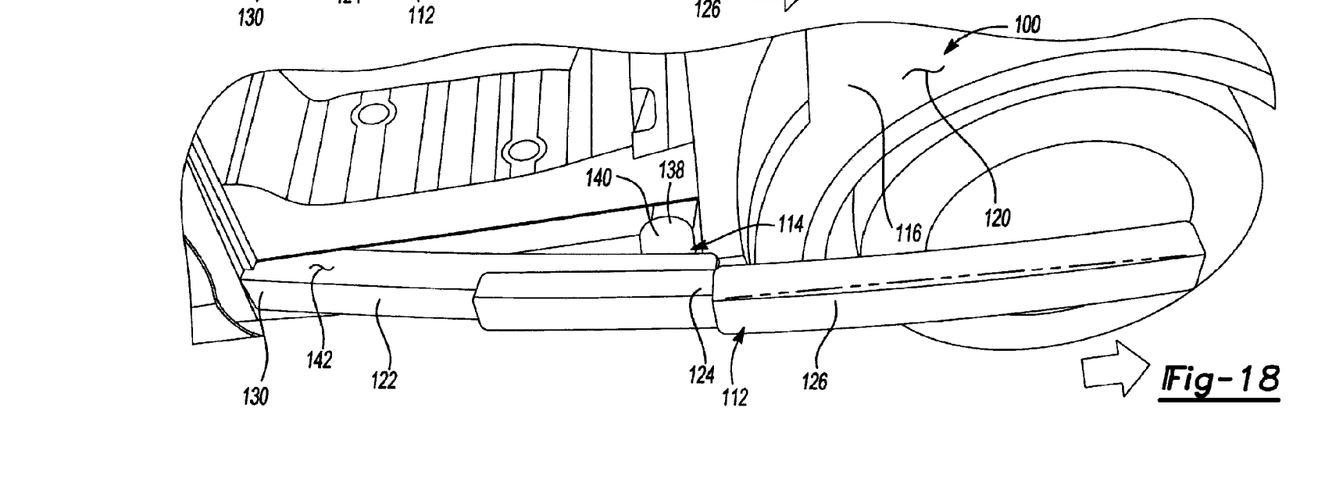
FIG. 18 is a partial perspective view of the vehicle of FIG. 8 showing the track assembly of FIG. 15 in a pivoted and fully extended state.

With particular reference to FIGS. 16-18, the actuation mechanism 114 is shown to include a first link 138 and a second link 140. The first link 138 may be pivotably attached proximate to the sill 128 of the vehicle at a first end and may be pivotably attached to the second link 140 at a second end. The second link 140 may be pivotably attached to the first link 138 at a first end and may be pivotably attached to the first track portion 122 at a second end. The actuation mechanism 114 may be movable between an unlocked state when the side door 108 is in the closed state and a locked state when the side door 108 is moving from the closed state to the open state and also when the side door 108 is in the open state.

The first link 138 and second link 140 may cooperate with the first end 130 and associated link (not shown) of the first end 130 to provide the first track portion 122 and, thus, the second track portion 124 and third track portion 126 with a four-bar linkage that permits the first track portion 122, second track portion 124, and third track portion 126 to both pivot and move away from the sill 128 when the side door 108 is initially moved from the closed state to the open state.

While the actuation mechanism 114 is described as cooperating with the first track portion 122 to provide the side-door assembly 102 with a four-bar linkage, an eccentric cam (not shown) may be disposed proximate to the first end 130 of the first track portion 122 to provide the first track portion 122 with the ability to concurrently move away from the sill 128 and pivot about the first end 132. Such movement of the side door 108 provides for sufficient clearance between the side door 108 and the front door 132, thereby permitting the side door 108 and front door 132 to operate independently from one another.

With particular reference to FIGS. 15-18, operation of the side-door assembly 102 will be described in detail. A force may be applied to the side door 108 of the side-door assembly 102 by either applying a manual force to the side door 108 or by actuating a power system (not shown) associated with the side-door assembly 102 to move the side door 108 from the closed state toward the open state. Applying a force to the side door 108 causes the side door 108 to concurrently pivot about the first end 130 of the first track portion 122 and to move in the direction (Q) shown in FIG. 15. The first track portion 122 continues to move in the direction (Q) and to pivot about the first end (130) until the first link 138 and the second link 140 are in the locked state.

Figure 13:
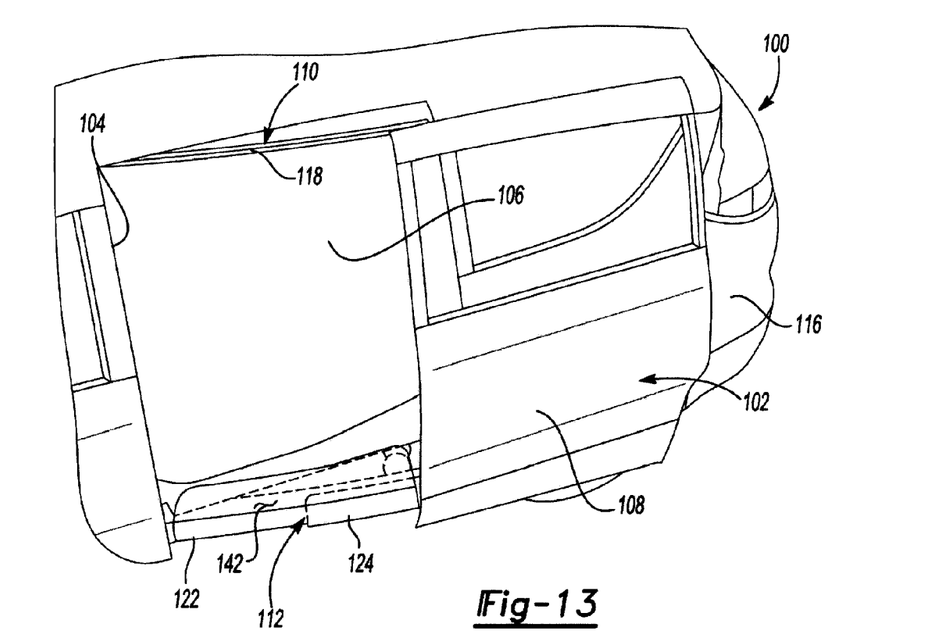
FIG. 13 is a partial perspective view of the vehicle of FIG. 8 showing the sliding-side door assembly in an open state.
Figure 14:
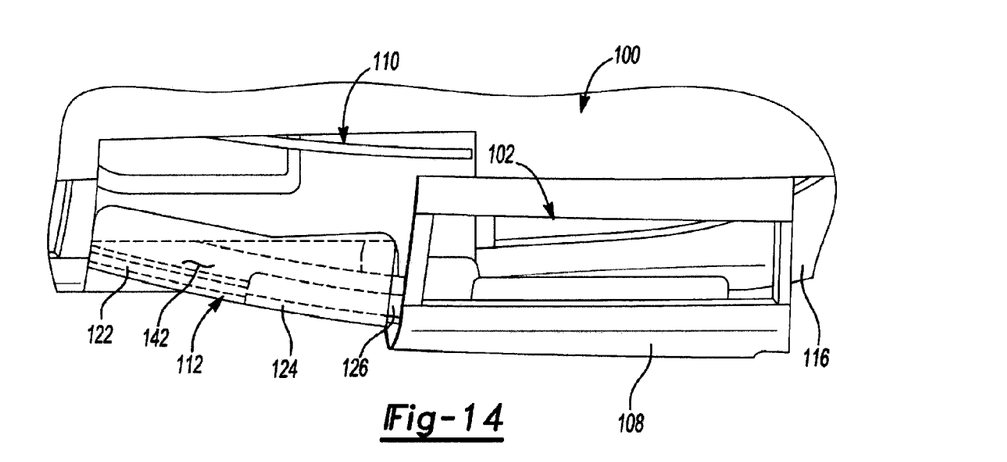
FIG. 14 is a partial, top perspective view of the vehicle of FIG. 8 showing the sliding-side door assembly in an open state.

Once the first link 138 and the second link 140 are in the locked state, the second track portion 124 is permitted to translate relative to the first track portion 122 in the direction (Z) shown in FIG. 8, thereby allowing the side door 108 to move in the direction (Z). Upon sufficient movement of the side door 108 in the direction (Z), the third track portion 126 may telescope from the second track portion 124 and continue movement along the direction (Z) until the side door 108 is in the fully open position (FIG. 13). When the side door 108 is in the fully open position (FIGS. 13 and 18), the first track portion 122 is exposed and may provide a step surface 142 that facilitates entry of a passenger into the passenger compartment 106.

As described, translation of the second track portion 124 relative to the first track portion 122 and translation of the third track portion 126 relative to the second track portion 124 is prevented until the first link 138 and the second link 140 are in the locked state. The first link 138 and second link 140 remain in the locked state when the side door 108 moves relative to the rear-quarter panel 116 in the direction (Z) to provide stability and support to the side door 108 as the side door 108 moves in the direction (Z).

Figure 15:
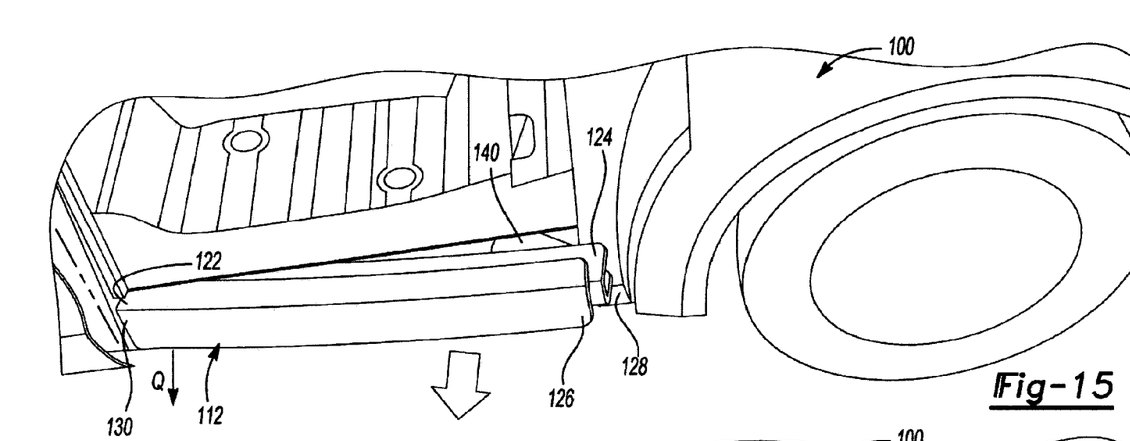
FIG. 15 is a partial perspective view of the vehicle of FIG. 8 with a door of the sliding-side door assembly removed to illustrate a track assembly.

A force may be applied to the side door 108 in a direction substantially opposite to direction (Z) to move the side door 108 from the open state toward the closed state. Movement of the side door 108 in the direction opposite to direction (Z) causes the third track portion 126 to once again slidably receive the second track portion 124 therein and causes the second track portion 124 to slidably receive the first track portion 122 therein until the first track portion 122 and second track portion 124 are received within the third track portion 126 (FIG. 15). At this point, the first link 138 and the second link 140 of the actuation mechanism 114 may be moved from the locked state to the unlocked state, thereby causing the first track portion 122 to both pivot about the first end 130 and move generally toward the sill 128 in a direction substantially opposite to direction (Q). Once the first track portion 122, second track portion 124, and third track portion 126 are disposed adjacent to the sill 128, the side door 108 is returned to the closed state and access to the passenger compartment 106 via the opening 104 is prevented until the side door 108 is once again moved from the closed state to the open state.

What is claimed is:

1. A door assembly for a vehicle, the door assembly comprising:
   a door selectively movable relative to the vehicle between an open state and a closed state;
   a first track slidably supporting said door relative to the vehicle between said open state and said closed state;
   a second track spaced apart from said first track, slidably supporting said door relative to the vehicle between said open state and said closed state, and including a first track portion and a second track portion, said first track portion operable to slide relative to said second track portion when said door is moved a predetermined distance relative to the vehicle; and
   a cam surface associated with said second track, said cam surface operable to cause said second track to pivot and move away from the vehicle to permit said first track portion to slide relative to said second track portion when said door is moved said predetermined distance.

2. The door assembly of claim 1, wherein said second track portion is received within said first track portion when said door is in said closed state.

3. The door assembly of claim 1, wherein said second track portion telescopes into said first track portion when said door is moved from said open state to said closed state.

4. The door assembly of claim 3, further comprising a third track portion that telescopes into said second track portion when said door is moved from said open state to said closed state.

5. The door assembly of claim 1, further comprising a third track slidably supporting said door and spaced apart and separated from said first track and said second track.

6. The door assembly of claim 5, wherein said second track is disposed between said first track and said third track.

7. The door assembly of claim 1, further comprising a biasing member operable to bias said second track in a direction toward the vehicle.

8. A door assembly for a vehicle, the door assembly comprising:
   a door selectively movable relative to the vehicle between an open state and a closed state;
   a first track slidably supporting said door relative to the vehicle between said open state and said closed state;
   a second track spaced apart from said first track, slidably supporting said door relative to the vehicle between said open state and said closed state, and including a first track portion and a second track portion, said first track portion operable to telescope from said second track portion when said door is moved a predetermined distance relative to the vehicle; and
   a lock cam operable to pivot and move said door away from the vehicle when said door is initially moved from said closed state towards said open state.

9. The door assembly of claim 8, wherein said second track portion is received within said first track portion when said door is in said closed state.

10. The door assembly of claim 8, further comprising a third track slidably supporting said door and spaced apart and separated from said first track and said second track.

11. The door assembly of claim 10, wherein said second track is disposed between said first track and said third track.

12. The door assembly of claim 8, further comprising a cam associated with said second track, said cam operable to cause said second track to pivot and move away from the vehicle to permit said first track portion to slide relative to said second track portion when said door is moved said predetermined distance.

13. The door assembly of claim 12, further comprising a biasing member operable to bias said second track in a direction toward the vehicle.

14. The door assembly of claim 8, wherein said lock cam is movable between an unlocked state when said door is in said closed state and a locked state when said door is sufficiently moved relative to the vehicle from said closed state to said open state.

15. The door assembly of claim 14, wherein said first track portion is restricted from moving relative to said second track portion until said lock cam is in said locked state.

16. A door assembly for a vehicle, the door assembly comprising:
   a door selectively movable relative to the vehicle between an open state and a closed state;
   a first track slidably supporting said door relative to the vehicle between said open state and said closed state;
   a second track spaced apart from said first track, slidably supporting said door relative to the vehicle between said open state and said closed state, and including a first track portion and a second track portion, said first track portion operable to telescope from said second track portion when said door is moved a predetermined distance relative to the vehicle; and
   a cam associated with said second track, said cam operable to cause said second track to pivot and move away from the vehicle to permit said first track portion to slide relative to said second track portion when said door is moved said predetermined distance.

17. The door assembly of claim 16, further comprising a biasing member operable to bias said second track in a direction toward the vehicle.

18. The door assembly of claim 16, wherein said second track portion is received within said first track portion when said door is in said closed state.

19. The door assembly of claim 18, wherein said second track portion telescopes into said first track portion when said door is moved from said open state to said closed state.

20. The door assembly of claim 19, further comprising a third track slidably supporting said door and spaced apart and separated from said first track and said second track.

* * * * *